United States Patent [19]

Duncan et al.

[11] Patent Number: 5,118,426
[45] Date of Patent: * Jun. 2, 1992

[54] PROCESS FOR PURIFYING IMPOTABLE WATER WITH HYPOCHLOROUS ACID

[75] Inventors: Budd L. Duncan, Athens; Richard C. Ness; Sudhir K. Mendiratta, both of Cleveland; Donald R. Leonard, Athens, all of Tenn.

[73] Assignee: Olin Corporation, Cheshire, Conn.

[*] Notice: The portion of the term of this patent subsequent to Jun. 9, 2009 has been disclaimed.

[21] Appl. No.: 558,714

[22] Filed: Jul. 26, 1990

[51] Int. Cl.$^5$ .............................. C02F 1/76; C02F 1/78
[52] U.S. Cl. .................................. 210/721; 210/723; 210/725; 210/754; 210/756; 210/758; 210/764; 426/66
[58] Field of Search ............... 210/631, 721, 725, 756, 210/758, 764, 754, 723; 423/473; 426/66

[56] References Cited

U.S. PATENT DOCUMENTS 4,147,761 4/1979 Wojtowicz et al. ................. 423/473
4,176,578 3/1979 Brennan et al. ..................... 423/473
4,504,456 3/1985 Yant .................................... 423/473
4,693,832 9/1987 Hurst .................................. 210/756

FOREIGN PATENT DOCUMENTS

C51111 5/1990 PCT Int'l Appl. .

OTHER PUBLICATIONS

G. C. White "The Handbook of Chlorination", 2nd ed. N.Y. Van Nostrand Reinhold, 1986, pp. 37-38, 307-309, 311-316.

Primary Examiner—Stanley S. Silverman
Assistant Examiner—Thomas M. Lithgow
Attorney, Agent, or Firm—Allen A. Meyer, Jr.; Paul Weinstein

[57] ABSTRACT

A process for sanitizing impotable water the improvement which comprises admixing with the impotable water a solution consisting of hypochlorous acid containing at least 0.5 percent by weight of HOCl and having a pH of less than 3 to prepare potable water having an available chlorine residual.

10 Claims, 1 Drawing Sheet

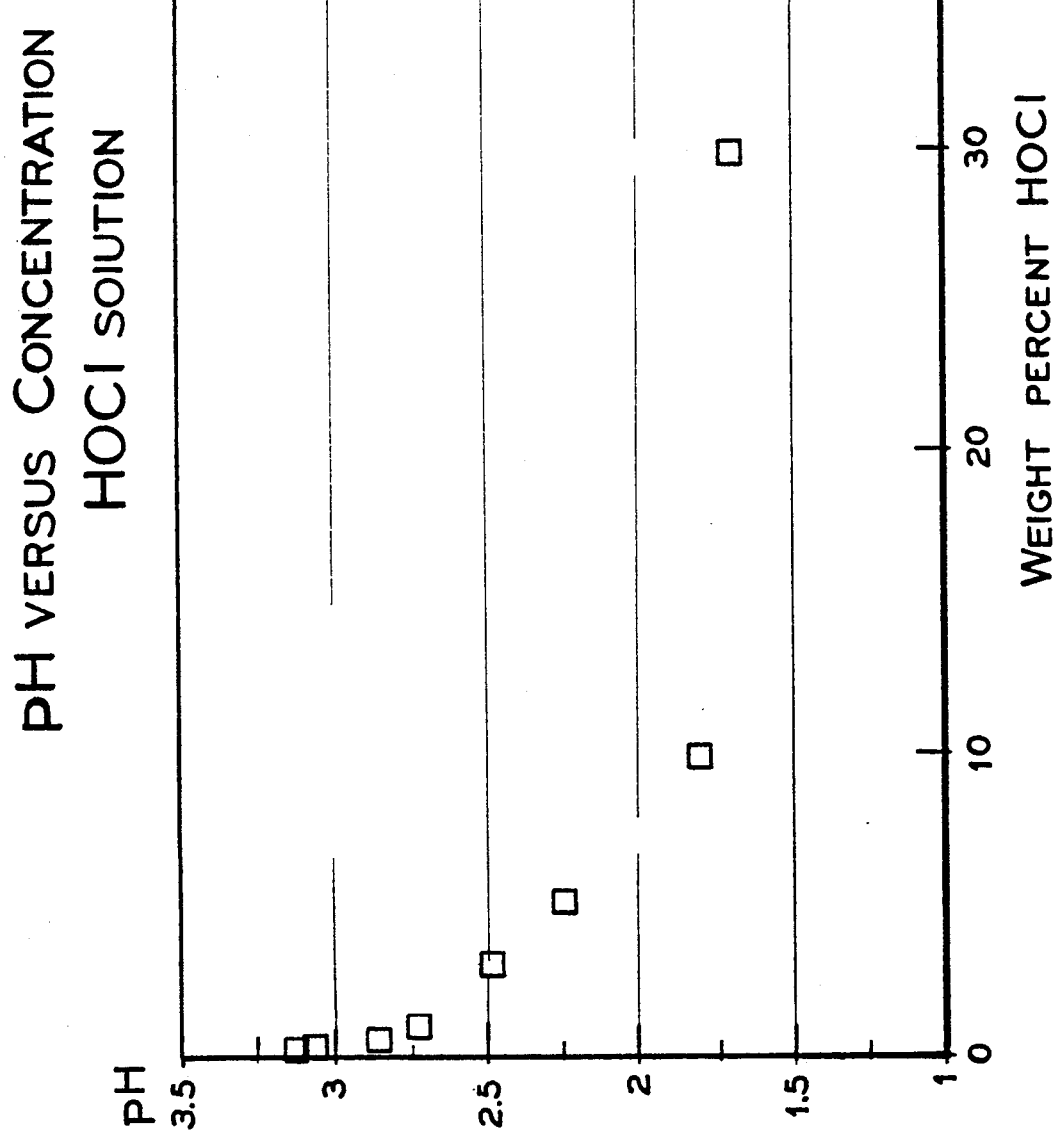

PROCESS FOR PURIFYING IMPOTABLE WATER WITH HYPOCHLOROUS ACID

BACKGROUND OF THE INVENTION

1. Field of the Invention

This invention relates to the purification of impotable water. More particularly, this invention relates to the purification of impotable water using hypochlorous acid.

2. Description of the Prior Art

For many years chlorine has been recognized as a good disinfectant and in one form or another has been involved in the majority of systems designed to produce potable water. In almost all modern water or sewage treatment plants, for example, chlorine is used to reduce the number of bacteria from the final effluent before it is discharged from the system to a potable water distribution system or into a river or stream. A chlorination plant or system may also provide for removing color, correcting tastes, eliminating odor and suppressing other types of undesirable biological growths. Chlorine is also widely used in the treatment of industrial wastes and waste waters.

Substantial advances in the chemistry of water chlorination have been made in recent decades. This chemistry is known to be relatively complex and various aspects of water chlorination chemistry may be reviewed in "Handbook of Chlorination" by G.C. White (Van Nostrand Reinhold, Second Edition, NYC, 1986).

In this connection, however, it is recognized that chlorine is a good disinfectant when applied to water in the form of a solution of chlorine ($Cl_2$) gas in water. When the chlorine is added to water it rapidly hydrolyzes to form hydrochloric acid (HCl) and hypochlorous acid (HOCl), the latter partly dissociating to provide hydrogen ions and hypochlorite ions ($H^+OCl^-$).

The three forms of available chlorine, namely, molecular chlorine ($Cl_2$), un-ionized hypochlorous acid (HOCl) and the hypochlorite ion ($OCl^-$), exist together in equilibrium, the relative proportions of each being determined by the PH value and temperature of the water. These forms of "available" chlorine react relatively rapidly with various types of water components including algae and bacteria as well as certain nitrogen and hydrocarbon compounds.

The "available" forms of chlorine compounds are known to be generally more potent than the "combined" forms, i.e. chloramines, which are produced by reaction with compounds present in the water to be treated. Dissolved molecular $Cl_2$ is also believed to be a very potent disinfecting agent, but does not exist in any appreciable quantity under equilibrium conditions at the pH of most water bodies. The pH must be reduced to a relatively low value in order to enable molecular $Cl_2$ to exist in solution in substantial concentrations.

It has been postulated that disinfection can be enhanced by improving sewage-aqueous chlorine mixing and by lowering the chlorine reaction pH. In treating water, the "Operation of chlorination equipment which supplies $Cl_2$ gas to water operates at partial pressures (vacuum). At the vacuum levels currently being used the maximum solubility is about 5000 mg/1. The upper limit of solubility recommended by all chlorinator manufacturers is 3500 mg/1. This arbitrary figure has been successful in preventing solution discharge systems from being adversely affected by gas pockets in the solution piping and off-gassing at the point of application" (White op cit pp 37-38).

U.S. Pat. No. 4,693,832, issued Sep. 15, 1987 to M.M. Hurst, describes a method of preparing potable water by mixing into semi-finished water an aqueous solution of hypochlorous acid having a pH of between about 3 and about 6 in amounts which provide the water with a free chlorine residual of at least about 0.5 ppm. The aqueous solutions contain between 0.1 and 10 grams of HOCl per liter. The method employs dilute solutions of impure hypochlorous acid having high pH values. These HOCl solutions are stated to provide the water with free available chlorine residuals having improved stability. However, to obtain the required pH range it is necessary to supply a base to the hypochlorous acid solution or employ a method of preparation which will prepare hypochlorous acid solutions having the desired pH.

SUMMARY OF THE INVENTION

It is an object of the present invention to provide a process for preparing potable water by treating impotable water with a highly pure, highly acidic solution of hypochlorous acid.

It is an added object of the present invention to provide a process for preparing potable water having reduced formation of trihalomethane compounds.

It is a further object of the present invention to provide a process for preparing potable water in which the feed rate of the chlorinating agent is easily controlled.

It is an additional object of the present invention to provide a process for preparing potable water which does not require the handling of pressurized gaseous or liquid chlorine.

These and other objects are accomplished in a process for sanitizing impotable water in which the improvement comprises admixing with the impotable water at least 0.5 percent by weight of a solution consisting of hypochlorous acid having a pH of less than 3 to prepare potable water having an available chlorine residual.

BRIEF DESCRIPTION OF THE DRAWINGS

More in detail, the novel process of the present invention employs highly pure, highly acidic hypochlorous acid solutions. The FIGURE graphically depicts the pH of HOCl solutions having concentrations in the range of 0.1 to 45 weight percent of HOCl.

DETAILED DESCRIPTION OF THE INVENTION

The novel process of the present invention employs as the starting material a concentrated solution of high purity hypochlorous acid, HOCl. One method of producing high purity concentrated HOCl solutions is that in which gaseous mixtures, having high concentrations of hypochlorous acid vapors and chlorine monoxide gas and controlled amounts of water vapor are produced, for example, by the process described by J. P. Brennan et al in U.S. Pat. No. 4,147,761, which is incorporated in its entirety by reference. The gaseous mixture is then converted to a concentrated hypochlorous acid solution as described in WO 90/05111 published May 17, 1990 by J. K. Melton, et. al. which is incorporated in its entirety by reference.

The concentrated hypochlorous acid solution employed as a reactant contains from about 0.5 to about 60 percent by weight of HOCl. Preferred solutions are those having concentrations in the range of from about 1 to about 45, and more preferably from about 5 to about 15 percent by weight of HOCl. The solution is substantially free of ionic impurities such as chloride ions and alkali metal ions and has low concentrations of dissolved chlorine. For example, concentrations of the chloride ion are preferably less than about 50 parts per million and the alkali metal ion concentration is preferably less than about 50 parts per million. The dissolved chlorine concentration in the hypochlorous acid solution is normally less than about 2 percent, and preferably less than about 1 percent by weight. The pH of dilute highly pure HOCl solutions is less than 3, and as the concentration of HOCl increases, the pH is reduced, thus for highly concentrated solutions the pH falls below 0, i.e. the solutions cannot be adequately described by a pH designation.

In the purification of impotable water, the initial step in the treatment process is often the use of a limited amount of an oxidizing agent, including for example, hydrogen peroxide, ozone or chlorine-containing compounds such as chlorine or hypochlorites. The amount of oxidizing agent used may vary from a minimal amount to keep the lines and equipment free of undesirable organisms. to that which satisfies the "chlorine demand", that is, the amount of chlorine which is consumed by water impurities without providing a substantial amount of unconsumed chlorine which remains as residual available chlorine. In the novel process of the present invention, this initial oxidation step is carried out using the highly acidic hypochlorous acid solution having a pH of less than 3.

Following the initial addition of an oxidizing agent, where used, it is commonplace to treat the pre-disinfected impotable water with a flocculant such as alum, which is utilized as a coagulation agent for allowing the flocculation of solid particles to take place. Suitable floculants include trivalent aluminum compounds, Al-(III), such as alum, trivalent iron compounds, Fe(III), i.e., ferric chloride, as well as compounds of other multivalent metal cations e.g. Pb(II).

It will be understood that the order of addition of the oxidizing agent is not critical, and that it may be added simultaneously with the flocculant, as well as after the addition of the flocculant. Addition of the hypochlorous acid solution during flocculation assists in the removal of algae, as the dead cells of these organisms are more readily coagulated. In any case, the addition of the oxidizing agent is carried out prior to the sedimentation period which normally is at least 2 hours long.

After the solid particles suspended in the impotable water had been removed, for example, by sedimentation and/or filtration; the impotable water filtrate is then subjected to a disinfection treatment by admixing at least 0.5 percent by weight of the solution consisting of hypochlorous acid having a pH of less than 3. The highly acidic hypochlorous acid solution may be added directly to the impotable water as it readily mixes with the impotable water to kill the pathogens present and produce a potable water supply. Further, in water treatment plants which introduce chlorine gas into a stream of water to provide adequate mixing prior to addition to the body of impotable water, the hypochlorous acid solution may also be fed to this carrier stream.

The potable water, now ready for distribution to the ultimate consumers, contains available chlorine residuals in amounts which will provide a safe water supply throughout the distribution system. Suitable residuals measured as available chlorine include those in the range of from about 0.2 to about 0.5 ppm.

The novel process of the invention produces potable water in a treatment which minimizes the formation of toxic organic chlorine compounds such as trihalomethanes (THM).

The process of the present invention is further illustrated by the following Examples, with no intention of being limited thereby. All parts and percentages are by weight unless otherwise indicated.

EXAMPLE 1

Impotable river water ( 1000 mls.) was adjusted to a pH of 4 by the addition of sulfuric acid. The water was divided into two equal portions. To one portion a calcium hypochlorite solution [0.2% $Ca(OCl_2)$] was added to provide 4 ppm of available chlorine. The second portion was treated with a 2% solution of HOCl having a pH of <3. After a period of 6 hours, the water treated with calcium hypochlorite was analyzed and found to contain 18 parts per billion (ppb) of chloroform. The water treated with HOCl after six hours contained 8 ppb of chloroform. Coliform disinfection was total in both portions.

EXAMPLE 2

The procedure of Example 1 was repeated using portions of the river water with the pH at 7. The portion treated with the hypochlorite solution contained 110 ppb of chloroform. The HOCl treated water portion contained only 100 ppb of chloroform. Coliform disinfection was total in both portions of river water.

Examples 1 and 2 show that while disinfection of water is accomplished by both chlorinating agents, a reduction in the concentrations of chloroform produced is achieved by the process of the invention.

EXAMPLE 3

An 8 liter sample of impotable pond water at a pH of 8.5 was divided into two portions. One portion of the water was treated with a solution of NaOCl (5%) to provide the pond water with 2 ppm of available chlorine. To a second equal portion of pond water was added a hypochlorous acid solution containing 30% by weight of HOCl and having a pH of less than 2 to provide 2 ppm of available chlorine. Each portion was periodically analyzed for trihalomethane concentrations. The results are given in Table I below.

| TOTAL TRIHALOMETHANES (ppb) IN POND WATER (pH 8.5) | | |
|---|---|---|
| Time (min) | $H_2O$ treated with HOCl | $H_2O$ treated with NaOCl |
| 30 | 5 | 18 |
| 60 | 11 | 21 |
| 90 | 16 | 30 |
| 180 | 22 | 30 |

A significant reduction in trihalomethanes was attained using the highly acidic hypochlorous acid solution in alkaline pond water.

What is claimed is:

1. In a process for sanitizing impotable water the improvement which comprises admixing with the impotable water a solution consisting of hypochlorous acid substantially free of ionic impurities containing at least 0.5 percent by weight of HOCl and having a pH of less than 3 to prepare potable water having an available chlorine residual.

2. The process of claim 1 in which the concentration of hypochlorous acid is from about 1 to about 45 by weight of HOCl.

3. The process of claim 1 in which the hypochlorous acid has a dissolved chlorine concentration of less than about 2 percent by weight.

4. A process for sanitizing impotable water which comprises admixing with the impotable water a preliminary dose of a first solution consisting of hypochlorous acid, substantially free of ionic impurities, containing at least 0.5 percent by weight of HOCl and having a pH of less than 3 to form a pre-disinfected impotable water, admixing a flocculating agent with the pre-disinfected impotable water, and admixing with the pre-disinfected impotable water a sanitizing amount of a second solution consisting of hypochlorous acid, substantially free of ionic impurities, containing at least 0.5 percent by weight of HOCl and having a pH of less than 3 to prepare potable water having an available chlorine residual.

5. The process of claim 4 in which the pre-disinfected water is filtered.

6. The process of claim 5 in which the second solution has a concentration of hypochlorous acid of from about 1 to about 45 by weight of HOCl.

7. The process of claim 6 in which the sanitizing amount of the second solution provides the potable water with a residual chlorine concentration of from about 0.2 to about 0.5 ppm.

8. The process of claim 6 in which the first solution and the second solution of hypochlorous acid each has a dissolved chlorine concentration of less than about 2 percent by weight.

9. The process of claim 1 in which the concentration of hypochlorous acid is from about 5 to about 15 percent by weight of HOCl.

10. The process of claim 4 in which the concentration of hypochlorous acid in the first solution is from about 5 to about 15 percent by weight of HOCl.

* * * * *